United States Patent [19]
Boggs

[11] 3,756,559
[45] Sept. 4, 1973

[54] SOLENOID-OPERATED VALVE
[75] Inventor: Weldon C. Boggs, Tampa, Fla.
[73] Assignee: Food Research & Equipment Company, Tampa, Fla.
[22] Filed: Sept. 23, 1970
[21] Appl. No.: 74,648

[52] U.S. Cl. ............................................. 251/335
[51] Int. Cl. .......................................... F16k 41/04
[58] Field of Search ................ 251/335 B, 141, 214; 137/608

[56] References Cited
UNITED STATES PATENTS

| | | | |
|---|---|---|---|
| 1,478,815 | 12/1923 | Blauvelt | 251/335 B |
| 2,888,037 | 5/1959 | Jones et al. | 251/335 B |
| 3,423,064 | 1/1969 | Harland et al. | 251/214 X |
| 3,567,176 | 3/1971 | Johnson | 251/214 X |
| 2,114,139 | 4/1938 | Crosthwait, Jr. et al. | 251/335 B |
| 3,253,611 | 5/1966 | Cummins | 251/337 X |
| 3,399,697 | 9/1968 | Schwartz | 137/608 X |
| 1,548,122 | 8/1925 | Dunham | 251/335 B |
| 3,366,288 | 1/1968 | Goldschein | 251/141 X |
| 2,693,822 | 11/1954 | Gerow et al. | 251/335 B |
| 1,527,154 | 2/1925 | Mallory et al. | 251/335 B |
| 1,727,281 | 9/1929 | Fulton | 251/335 B |
| 2,642,890 | 6/1953 | Skewis | 251/335 B |
| 2,880,620 | 4/1959 | Bredtschneider | 251/335 B |

Primary Examiner—Samuel Scott
Attorney—Bacon & Thomas

[57] ABSTRACT

A solenoid-operated valve having a valve stem sealed by a flexible metallic bellows, the stem having a shoulder and the bellows having a stem flange with a cylindrical collar fitting closely on the stem and sealed against and circumferentially fused or welded to the stem of the shoulder. The stem flange has concentric undulations outwardly of the collar to impart flexibility thereto. The bellows also has a base flange with concentric undulations and a cylindrical offset between the outer undulation and a flat marginal flange. This flange is clamped against an abutment formed in the valve body, and an O-ring is disposed in a recess in the valve body and is compressed between said flange and the cylindrical offset. The bellows further comprises a number of intermediate convolutions, each consisting of a pair of annular diaphragms having their inner and outer marginal peripheries fused or welded together, and also provided with undulations to impart flexibility. The valve stem carries a partially spherical head at its lower end, which engages a sharp-edged seat in the valve body. The valve body may include more than one valve, with the valve stems thereof independently operated by different solenoids.

10 Claims, 6 Drawing Figures

INVENTOR
WELDON C. BOGGS
BY
Bacon & Thomas
ATTORNEYS

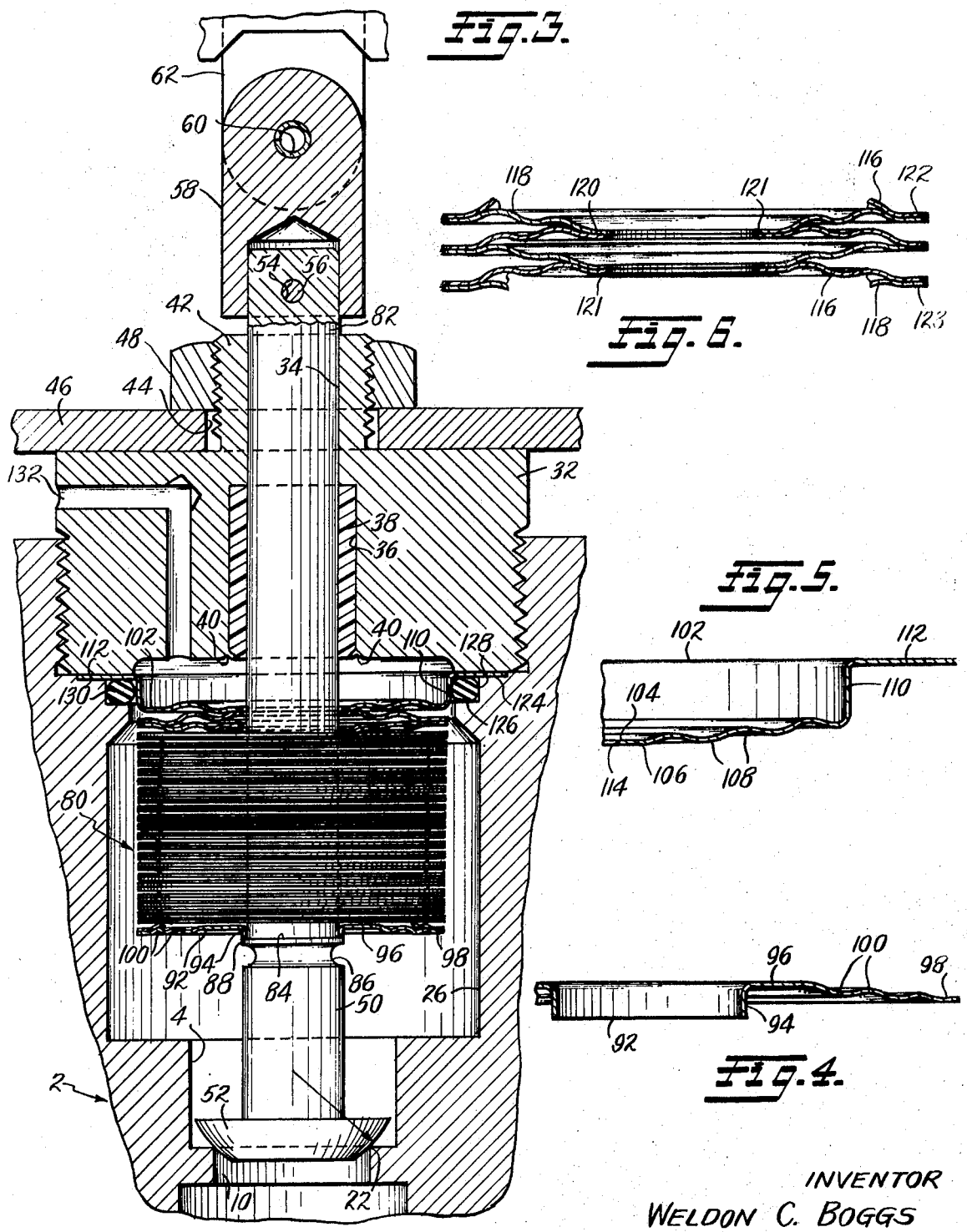

SOLENOID-OPERATED VALVE

FIELD OF THE INVENTION

The present invention relates to solenoid-operated valves, and more particularly to a solenoid-operated valve having a novel stem, long-lived bellows, and body construction designed to provide trouble-free operation and to prevent leakage along the stem.

DESCRIPTION OF THE PRIOR ART

Solenoid-operated valves including a stem sealed by a bellows have been known heretofore, but one of the objections to prior valves of this type is that they do not provide a long-lasting seal for the valve stem and soon leak. Another objection is that the bellows usually comprises thin, metal diaphragm sections that become fatigued and crack after a period of use, resulting in leakage and rendering the valve useless. The foregoing objections have been overcome by the present invention, wherein the lower end of the bellows has a stem flange that is permanently sealed with the valve stem and the upper end of the bellows has a base flange that is sealed with the valve body by an O-ring maintained under compression. Fatigue and cracking of the metal diaphragm sections is avoided by providing concentric undulations therein, which greatly increase their flexibility and consequently their resistance to fatigue. A test conducted with a valve and bellows designed in accordance with the principles of the present invention has withstood well over one-half million contracting and expanding actions without failure.

SUMMARY OF THE INVENTION

The present invention relates to a multiple solenoid-operated valve comprising a single body and a pair of valves individually operated by a solenoid connected with the valve stem of each of the valves. The valve body has a single inlet port and two outlet ports, flow through the outlet ports being controlled by the separately operable valves. The valve body also includes cavities aligned with the outlets to receive a subassembly of a valve stem and bellows, each of which subassemblies is maintained in place in the valve body by a removable retainer. Each reatiner contains a "TEFLON" bushing for the valve stem. Each retainer also has a threaded extension for securing it to a mounting plate. Each valve stem extends beyond the threaded extension when the valve is fully closed and is connected by a link with a solenoid. The lower end of the valve stem carries a partially spherical head that engages with a sharp-edged valve seat associated with each outlet port of the valve. However, the valve head and valve seat are not novel per se and form no part of the present invention, since generally similar structures are shown in French Pat. No. 494,261 and U.S. Pat. Nos. 2,073,112, 2,360,945 and 2,859,765.

The present valve is especially well adapted for use in a deep fat fryer of the type including a system through which hot cooking oil is cycled, and which cooking oil may contain entrained soft solids, such as batter and food particles. Hence, the valve includes a sharp seat and a partially spherical valve head having line contact for cutting through soft solids and thus assuring tight closing of the valve. In this connection, the bellows is heat-treated to impart spring-like tension thereto, for maintaining the valve head engaged with its seat when the solenoid controlling the valve is de-energized.

Accordingly, the principal object of the invention is to provide a solenoid-operated valve having an improved leak-proof, valve stem and bellows construction.

Another object is to provide a solenoid-operated valve, wherein the bellows has a longer useful life than bellows of similar type valves heretofore available.

Another object is to provide a solenoid-operated valve including a bellows that can be satisfactorily used to handle liquids at high temperatures and maintain a permanent seal with a valve stem, and wherein the valve stem is so mounted that it will not stick in its guide means.

Still another object is to provide a bellows that is resilient and inherently provides a force tending to urge the valve stem connected thereto toward closed position, so that the valve will remain positively closed until the solenoid connected with the valve stem for operatng the valve is energized.

Still another object is to provide a valve stem and bellows subassembly that can be readily mounted in and removed from a valve body.

Other objects and advantages of the invention will become apparent from the following descriptions taken in conjunction with the accompanying drawings.

DESCRIPTION OF THE DRAWINGS

FIG. 3 is an enlarged fragmentary sectional view through the valve illustrating the details of the manner in which the lowermost section, or stem flange, of the bellows is secured to the stem, and the manner in which the uppermost section of the bellows, or base flange, is mounted and sealed with respect to the valve body;

FIG. 4 is an enlarged fragmentary sectional view through the stem flange of the bellows;

FIG. 5 is a similar view of the base flange of the bellows; and

FIG. 6 is a further enlarged fragmentary sectional view through a portion of the intermediate convolutions of the bellows.

DESCRIPTION OF THE PREFERRED EMBODIMENT

Figure 1:
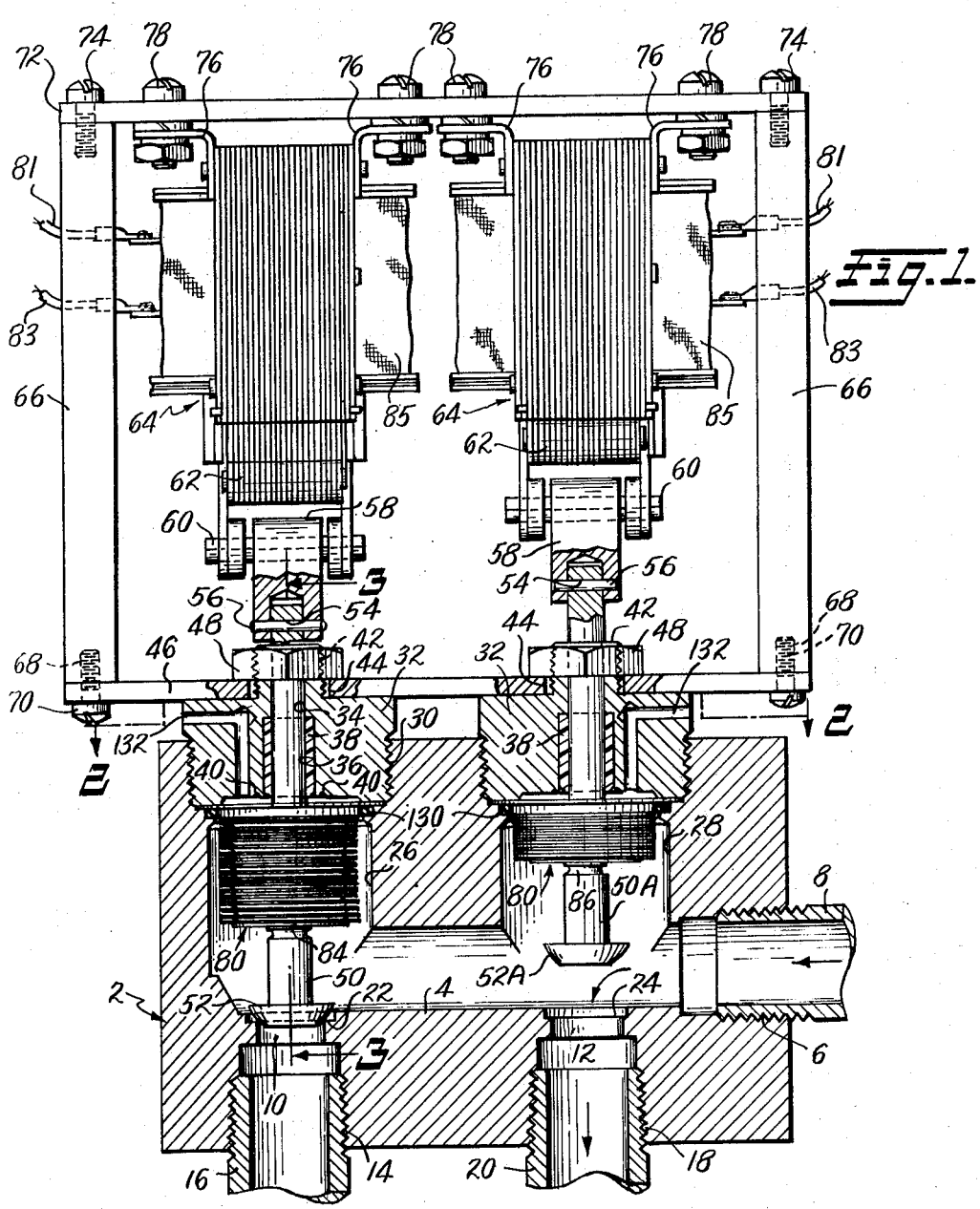
FIG. 1 is a vertical sectional view through a solenoid-operated valve having two valve stems with bellows seals constructed in accordance with the principles of the present invention.

Referring to FIG. 1, the valve body is generally identified by the numeral 2 and may be made from a block of aluminum, or cast from aluminum, stainless steel, or any other suitable metal. The bocks 2 has a blind longitudinal inlet passageway or port 4 provided with threads 6 at its outer end to receive a pipe 8, which may serve as a supply pipe. The valve body 2 has ports 10 and 12, which intersect the passageway 4, and serve as outlet ports. The port 10 has threads 14 at its outer end in which a pipe 16 is mounted, and the port 12 has threads 18 in which a pipe 20 is mounted. The ports 10 and 12 are counterbored at their upper end to provide seats 22 and 24, respectively. The side wall of the ports 10 and 12 is vertical, while the bottom of the counterbores 22 and 24 is horizontal, so that the seats 22 and 24 have a sharp right angle corner or cutting edge.

The valve body 2 contains vertical chambers 26 and 28, which also intersect with the passageway 4 and are axially aligned with the ports 10 and 12, respectively. The chamber 26 is enlarged at its upper end and has threads 30 into which a retainer plug 32 is threaded. The plug 32 has a passage 34 that is enlarged at its lower end to form a recess 36 in which a cylindrical TEFLON bushing 38 is mounted.

The bushing 38 is held in place by peening the lower end of the retainer 32 adjacent the recess 36, as indicated at 40. The plug 32 has a threaded axial extension 42 that extends through an opening 44 in a plate 46. A nut 48 is mounted on the extension 42 and secures the plate 46 to the plug 32. A stainless steel valve stem 50 is slidably mounted in the bushing 38 and has a partially spherical valve head 52 at its lower end for engaging the seat 22 with line contact. The stem 50 is of such length that its upper end extends beyond the extension 42 when the valve head 52 is engaged with the seat 22.

An opening 54 is formed in the upper end of the stem 50 to receive a pin 56, which pivotally connects the stem to a link 58. The upper end of the link 58 is pivotally connected by a pin 60 to an armature 62 of a conventional electromagnet or solenoid 64. Spacers 66 have threaded openings 68 at their lower end to receive screws 70, which secure the spacers to the plate 46. A second plate 72 is similarly secured to the upper end of the spacers 66 by screws 74. The solenoid 64 carries brackets 76 that are secured to the plate 72 by bolts 78, as shown. Electrical leads 81 and 83 are connected to a coil 85 of the solenoid for supplying current to energize the same and open the valve 52.

The plates 46 and 72 and the spacers 66 provide a frame for supporting the solenoid 64 that operates the valve 52. The valve head 52 is engagable with the sharp edge of the seat 22 so as to close with substantially line contact. This construction enables the valve head 52 to cut through any soft solids that may be entrained in the liquid flowing through the valve at the time the solenoid 64 is de-energized to let the valve close.

A fluid-tight seal for the stem 50 is provided by a resilient metallic bellows generally identified by the numeral 80. Referring to FIG. 3, the stem 50 has an upper portion 82 of smaller diameter than the portion thereof adjacent the valve head 50, whereby the juncture of the two cylindrical portions provides a horizontal shoulder 84. A groove 86 semicircular in radial cross section is cut into the stem 50 adjacent the shoulder 84 to provide a flange 88 having a narrow marginal edge.

The bellows 80 consists of a series of annular diaphragm sections connected together in a manner which will be described more fully hereinafter. The lowermost section, or stem flange of the bellows, is identified by the numeral 92, FIG. 4, and includes a depending cylindrical collar 94 closely fitting the stem portion 82 and having its end abutting the shoulder 84, and being fused or welded thereto throughout its circumference to provide a tight seal between the two. The narrow marginal edge of the flange 88 facilitates such operation. The section 92 has a flat central area 96 immediately adjacent the collar 94, and also has a flat marginal edge 98. The flat central area 96 extends outwardly for a distance of about one-third of the radial length between the collar 94 and the outer periphery of the marginal portion 96, the intermediate area having concentric undulations 100. The purpose of the undulations 100 is to render the stem flange section 92 flexible so that it will function satisfactorily indefinitely without cracking or fracturing from fatigue.

The uppermost section, or base flange, of the bellows 80 is identified by the numeral 102 (FIG. 5) and comprises a flat marginal inner portin 104 adjacent to which is a flat annular portion 108 surrounded by undulations 106, which blend into a vertically offset cylindrical portion 110, having substantially the same outside diameter as the outer diameter of the stem flange section 92. A horizontal flange 112 extends outwardly from the upper edge of the offset 110. The section 102 has a central opening 114 to receive the valve stem 50. A shallow depression surrounds the opening and is defined in part by the flat inner marginal portion 104.

The remainer of the bellows 80 consists of convolutions each including an upper diaphragm 116 and a lower diaphragm 118. Each of the diaphragms 116, 118 has flat inner and outer marginal portions 120 and 122 respectively with concentric undulations therebetween arranged so that the diaphragms can nest relative to each other. The inner marginal portions 120 surround an openig through which the valve stem 50 extends. The inner and outer marginal portions 120 and 122 of adjacent sections are fused or welded together throughout their periphery as indicated at 121 and 123, so that the bellows is leakproof.

As is best shown in FIG. 3, the valve body 2 has a shallow annular depression 124 to receive the flange or rim 112 of the base flange 102. This rim is clamped in place by the lower face of the retainer plug 32. The valve body 2 is counterbored at 126 to provide a shoulder forming a recess 128 to receive an O-ring 130 that forms a seal between the valve body, the rim 112 of the base flange 102 and the cylindrical offset 110.

Figure 2:
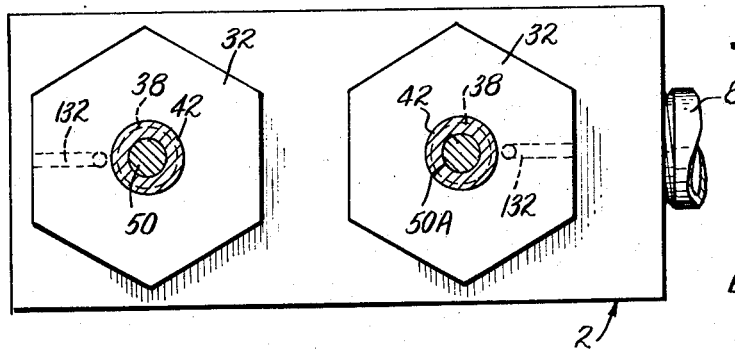
FIG. 2 is a plan view of the valve as viewed on the line 2—2 of FIG. 1.

The plug 32, FIG. 2, has a vent passage 132 that establishes communication between the interior of the bellows 80 and the outside atmosphere. This eliminates the possibility of any air pressure developing within the bellows 80, and also serves as a means for detecting leakage past the valve stem 50 should any occur.

FIG. 6 illustrates the general method of assembly of the intermediate sections of the bellows, that is, the convolutions lying between the stem flange 92 and the base flange 102. Thus, each convolution of the bellows comprises the upper and lower diaphragms 116 and 118. In fabricating the same, the inner margins 120 of an upper and lower diaphragm are welded or fused together at their inner periphery as indicated at 121, and then sections consisting of the two diaphragams are placed in contact and welded or fused together at their outer margin 122, as indicated at 123. At such time, the stem flange 92 and the base flange 102 are fused or welded in place. The assembled bellows 80 can thus be welded to the stem 50 at the collar 94 and flange 88.

A device embodying the principles of the present invention may include any desired number of valves, but for illustrative purposes two valve and two solenoids have been shown. These are identical and in the interest of brevity, the stem of the second valve has been identified by the numeral 50A, and the valve head by the numeral 52A. The remaining corresponding parts have been given the same number as used in the foregoing description. The valves 52 and 52A have a stroke of about 1/2 inch, but the length of the stroke may be varied as desired. In any event, it is preferable to design the valve body so that the bellows 80 is out of the path of flow of the liquid when either of the valves 52 or 52A is closed. This condition can be readily visualized by observing the position of the bellows 80 in connection with the closed valve 52 in FIG. 1.

The present valve is especially designed to handle hot liquid, for example, cooking oil at temperatures which may range up to 400° F and higher. Smooth and free operation of the valve stems 50 and 50A is assured by having the stems slide in the TEFLON bushings 38. These bushings not only resist high heat, but require no special lubricant to eliminate sticking of the valve stems.

In the operation of the valve, it will be understood that the valves 52 and 52A can be independently opened, or if desired, both valves can be simultaneously held open by energizing the solenoids 64. Flow through the valve body 2 may be in any direction desired, so long as at least one of the valves 52 or 52A is open. The spring tension built into the bellows 80 will maintain the associated valves in closed position when the solenoids 64 are de-energized. It will be understood that the weight of the solenoid armature 62, link 58 and the weight of the valve stems 50 and 50A themselves will aid in maintaining the valves closed when the electromagnetic coils 84 are de-energized. The bellows 80 may have any number of convolutions depending upon the enrironment in which it is to be used.

It will be understood that various changes may be made in the details of the design and construction of the present valve without departing from the principles of the invention or the scope of the annexed claim.

I claim:

1. A valve construction, comprising: a body having a passageway and at least one port communicating with said passageway and having a valve seat surrounding said port; a valve including a stem axially aligned with said seat, said stem having a narrow radial shoulder formed thereon; a bellows mounted upon said stem having an annular stem flange at one end thereof provided with an axially extending collar at its inner margin closely fitting said stem with the collar abutting said shoulder, said collar being circumferentially welded or fused to said shoulder, said body having a cavity in which the bellows is received and a shallow recess surrounding the upper end of said cavity, said recess having a bottom, said bellows including a base flange having a rim received in said recess; and a retainer plug threaded into said cavity and engaging said rim to clamp the same against the bottom of said recess, said retainer plug having a bore containing a TEFLON bushing receiving the valve stem therein and serving as a guide for said valve stem.

2. In a valve, the sub-combination comprising: a cylindrical valve stem having a narrow radial shoulder; and a bellows including an annular stem flange at one end thereof having an axially extending collar at its inner margin closely fitting said stem with the edge of the collar abutting said shoulder, said collar being circumferentially welded or fused to said shoulder, said bellows including a base flange at its other end, said base flange having a central opening defining an inner margin surrounding the valve stem, said base flange having undulations outwardly of said inner marginal edge, and having a cylindrical offset portion adjacent the outermost undulation and an outwardly extending rim projecting from the upper edge of said cylindrical offset portion.

3. A valve construction, comprising: a body having a passageway and at least one port communicating with said passageway and having a valve seat surrounding said port; a valve including a stem axially aligned with said seat, said stem having a narrow radial shoulder formed thereon; a bellows mounted upon said stem having an annular stem flange at one end thereof provided with an axially extending collar at its inner margin closely fitting said stem with the collar abutting said shoulder, said collar being circumferentially welded or fused to said shoulder, said body having a cavity in which the bellows is received and a shallow recess surrounding the upper end of said cavity, said recess having a bottom, said bellows including a base flange having a rim received in said recess; a retainer plug threaded into said cavity and engaging said rim to clamp the same against the bottom of said recess, said base flange including a cylindrical offset at the inner margin of the rim, said valve body also having a counterbore disposed radially inwardly of the shallow recess and confronting said offset cylindrical portion; and an O-ring disposed in said counterbore and being engaged by said cylindrical offset portion and by said rim and compressed to form a seal between the valve body and the base flange of the bellows.

4. A valve construction as defined in claim 3, wherein a solenoid is connected with the valve stem; and wherein the bellows has spring tension built into it to maintain the valve closed when the solenoid is deenergized.

5. A valve construction, comprising: a body having a passageway extending lengthwise thereof and serving as an inlet, and having a pair of outlet ports intersecting said passageway and having a valve seat surrounding each of said outlet ports, said body also having a chamber aligned with each of said outlet ports; a valve including a valve stem axially aligned with each of said outlet ports, each of said valve stems having a narrow radial shoulder formed thereon; a bellows mounted upon each of said valve stems and having an annular stem flange at one end thereof provided with an axially extending collar at its inner margin closely fitting said valve stem with the collar abutting said shoulder, said collar being circumferentially welded or fused to said shoulder; and a solenoid connected with each valve stem.

6. A valve construction as defined in claim 5, wherein each solenoid includes an armature, and a link is disposed between each armature and valve stem and is pivotally connected to both.

7. A valve construction, comprising: a body having a passageway and at least one port communicating with said passageway and having a valve seat surrounding said port; a valve including a stem axially aligned with said seat, said stem having a narrow radial shoulder formed thereon; a bellows mounted upon said stem having an annular stem flange at one end thereof provided with an axially extending collar at its inner margin closely fitting said stem with the collar abutting said shoulder, said collar being circumferentially welded or fused to said shoulder, said body having a cavity in which the bellows is received and a shallow recess surrounding the upper end of said cavity, said recess having a bottom, said bellows including a base flange having a rim received in said recess; a retainer plug threaded into said cavity and engaging said rim to clamp the same against the bottom of said recess, said retainer plug having a threaded axial extension; a frame having a member provided with an opening, said extension projecting through the opening in the frame member and being secured to said frame member; and a solenoid mounted upon the frame and connected with the valve stem.

8. A valve construction as defined in claim 7, wherein the frame member is a plate, and wherein the frame further comprises a second plate, and a plurality of spacers mounted between said plate and wherein the solenoid is mounted on said second plate and is disposed between said spacers.

9. In a valve, the sub-combination comprising: a cylindrical valve stem having a narrow radial shoulder; and a bellows including an annular stem flange at one end thereof having an axially extending collar at its inner margin closely fitting said stem with the edge of the collar abutting said shoulder, said collar being circumferentially welded or fused to said shoulder, said valve stem having a groove therein adjacent the shoulder to form a narrow flange to facilitate the welding or fusing of said collar thereto.

10. The sub-combination defined in claim 9, wherein the stem flange has concentric undulations formed therein outwardly of the collar to render the same flexible.

* * * * *